(12) United States Patent
Lee et al.

(10) Patent No.: US 11,489,887 B1
(45) Date of Patent: Nov. 1, 2022

(54) SYSTEM FOR PROVIDING CONTACT CENTER SERVICES IN INTEGRATED WAY

(71) Applicant: MindwareWorks Co., Ltd., Seoul (KR)

(72) Inventors: Jae In Lee, Goyang-si (KR); Hyun Sun Cho, Seoul (KR); Seong Kuk Mun, Namyangju-si (KR); Kyung Taek Park, Seoul (KR)

(73) Assignee: MindwareWorks Co., Ltd., Seoul (KR)

( * ) Notice: Subject to any disclaimer, the term of this patent is extended or adjusted under 35 U.S.C. 154(b) by 0 days.

(21) Appl. No.: 17/706,560

(22) Filed: Mar. 28, 2022

(30) Foreign Application Priority Data

Feb. 17, 2022 (KR) .......................... 10-2022-0020527

(51) Int. Cl.
| | | |
|---|---|---|
| *H04L 65/1096* | (2022.01) | |
| *H04L 9/40* | (2022.01) | |
| *H04L 65/1104* | (2022.01) | |
| *H04L 65/1043* | (2022.01) | |
| *H04L 65/10* | (2022.01) | |

(52) U.S. Cl.
CPC ...... *H04L 65/1096* (2013.01); *H04L 63/0884* (2013.01); *H04L 65/10* (2013.01); *H04L 65/1043* (2013.01); *H04L 65/1104* (2022.05)

(58) Field of Classification Search
None
See application file for complete search history.

(56) References Cited

U.S. PATENT DOCUMENTS

| 6,038,293 | A  | * | 3/2000  | McNerney    | H04M 3/54    |
|-----------|----|---|---------|-------------|--------------|
|           |    |   |         |             | 379/88.19    |
| 6,798,766 | B1 | * | 9/2004  | Bevan       | H04M 7/128   |
|           |    |   |         |             | 379/221.09   |
| 10,091,358| B1 | * | 10/2018 | Molander    | G06T 11/206  |
| 10,250,749| B1 | * | 4/2019  | Boone       | H04M 3/4935  |
| 10,630,842| B1 | * | 4/2020  | Jayapalan   | H04M 3/5233  |
| 10,972,458| B1 | * | 4/2021  | Gaeta       | G06F 21/32   |
| 11,438,423|    | * | 9/2022  | Wang        | H04L 67/01   |
| 2008/0019500 | A1 | * | 1/2008 | Torres    | H04M 3/5237  |
|           |    |   |         |             | 379/265.02   |
| 2010/0303227 | A1 | * | 12/2010 | Gupta    | H04M 1/247   |
|           |    |   |         |             | 379/266.06   |
| 2013/0251125 | A1 | * | 9/2013 | DeLuca    | H04L 12/1818 |
|           |    |   |         |             | 379/93.02    |

(Continued)

FOREIGN PATENT DOCUMENTS

KR           10-1827320 B1      2/2018

*Primary Examiner* — Backhean Tiv
(74) *Attorney, Agent, or Firm* — Revolution IP, PLLC

(57) ABSTRACT

Disclosed is a system for providing contact center services in an integrated way, in which a client can receive query processing services by immediately connecting to at least one of other contact center servers operated by service providers cooperating in a link service by a call transfer without changing a preexisting connection state while being initially connected to a specific contact center server, so that a user can use a plurality of query processing services without difficulties by linking the contact center servers operated by the plurality of service providers, thereby minimizing the time, efforts and costs of the user who wants to receive the plurality of query processing services through the plurality of service providers.

4 Claims, 2 Drawing Sheets

(56) References Cited

U.S. PATENT DOCUMENTS

| | | | | |
|---|---|---|---|---|
| 2018/0152559 A1* | 5/2018 | Kaufmann | ........ | H04M 3/42382 |
| 2018/0352083 A1* | 12/2018 | Lin | ...................... | H04M 3/493 |
| 2021/0126970 A1* | 4/2021 | Zhang | ................ | G06F 16/2255 |
| 2021/0367909 A1* | 11/2021 | Lee | ...................... | G06Q 10/107 |

* cited by examiner

SYSTEM FOR PROVIDING CONTACT CENTER SERVICES IN INTEGRATED WAY

CROSS-REFERENCE TO RELATED APPLICATION

This application claims priority from Korean Patent Application No. 10-2022-0020527, filed on Feb. 17, 2022 in the Korean Intellectual Property Office, the disclosure of which is incorporated herein by reference.

BACKGROUND OF THE INVENTION

(a) Field of the Invention

The disclosure relates to a system for providing contact center services in an integrated way, and more particularly to a system for providing contact center services in an integrated way, which is convenient for a user to use a plurality of query processing services by linking contact center servers operated by a plurality of service providers.

(b) Description of the Related Art

A contact center has conventionally been called a 'call center' as a system that employs only a voice call to respond to a user. In relatively recent combination with various functions such as text counseling, chatting counseling, push notification, etc., the call center is collectively called the 'contact center' as it is utilized in home shopping, Internet shopping malls, insurance companies, banks, food delivery, accommodation reservations, etc. to answer customer questions or to recommend suitable products or services based on the preexisting consumer propensities.

In additional combination with various artificial intelligence technologies, technologies, which are called an 'artificial intelligence contact center,' have been on the rise.

The artificial intelligence contact center is also called an AI contact center where AI combines with the call center and a customer counselling center. Based on voice recognition, speech synthesis, text parsing, conversation engine, and the like technologies, telephone consultation services for business customers are optimized. The AI allows a customer to easily register his/her requirements, and provides answers on behalf of a representative when a solution is relatively simple, thereby increasing productivity of consultation work.

A user may want to receive query processing services by connecting to contact center servers respectively operated by a plurality of service providers. For example, a user may have to ask a contact center server of Lotte Card Co., Ltd. in succession while receiving a query processing service by connecting to a contact center server of Hyundai Card Co., Ltd., or a user may suddenly wonder about a delivery status of a purchase and ask a contact center server of a corresponding shopping mall while receiving a query processing service by connecting to a contact center server of a specific bank.

In this case, in a current contact center service, a user receives the query processing service by connecting to the contact center server of Hyundai Card Co., Ltd. through a voice-calling terminal, connection software, a browser or the like connection means, and then terminates the corresponding connection. Next, the user has to receive the query processing service again by connecting to the contact center server of Lotte Card Co., Ltd. through the voice-calling terminal, connection software, the browser or the like connection means.

Consequently, when a user wants to use the contact center servers respectively operated by the plurality of service providers, there is a disadvantage in that the user has to individually connect to each contact center server every time to receive the query processing service.

In relation to the technology of using the AI contact center server, Korean Patent No. 10-1827320 (hereinafter, referred to as the "related art") has proposed an AI contact center server capable of operating an unmanned contact center by AI.

However, the related art merely discloses a general AI contact center server configured to perform an AI process to get a correct answer to a question asked by a customer, but does not disclose that a plurality of queries a user wants to ask the plurality of service providers respectively are transmitted to the contact center servers and the contact center servers are linked to one another to more efficiently process the plurality of queries related to the services.

SUMMARY OF THE INVENTION

Accordingly, the disclosure is conceived to solve the foregoing conventional problems, and an aspect of the disclosure is to provide a system for providing contact center services in an integrated way, in which a client can receive query processing services by immediately connecting to at least one of other contact center servers operated by service providers cooperating in a link service through a call transfer without changing a preexisting connection state while being initially connected to a specific contact center server, so that a user can use a plurality of query processing services without difficulties by linking the contact center servers operated by the plurality of service providers, thereby minimizing the time, efforts and costs of the user who wants to receive the plurality of query processing services through the plurality of service providers.

According to the disclosure as proposed to solve the foregoing problems, a system for providing contact center services in an integrated way includes: a plurality of contact center servers operated by a plurality of service providers, and configured to provide a query processing service that generates a response to a query received from a client and transmits the response to the client; a client configured to receive a query processing service by connecting to another contact center server when making a request for connecting to the different contact center server while being connected to a specific contact center server among the plurality of contact center servers; and an integrated operation server configured to store and manage information about the plurality of service providers and the plurality of contact center servers, and perform an authentication process by proxy with regard to a user of the client as requested by the different contact center server.

Here, the contact center server may be configured to store and manage information about service providers cooperating in a link service, and link information about the contact center servers operated by the service providers.

Here, when receiving a link intention mark and information about one of the service providers cooperating in the link service from the client, the contact center server may make a request for a call transfer while transmitting information about session initiation protocols (SIP) of the client to the link information of the contact center server operated by the service provider of which the information is received.

Here, the contact center server making the request for the call transfer may terminate connection with the client after making the request for the call transfer or after the client is connected to a contact center server operated by a service provider requested to do the call transfer, the contact center server operated by the service provider requested to do the call transfer may connect to the client based on the information about the SIP and make a request for identifying whether authentication of the user is valid to the integrated operation server before or after connecting to the client, and the integrated operation server may transmit an authentication validation message and current valid user information to the contact center server, which makes the request for identifying whether the authentication of the user is valid, when the authentication of the user is valid, and perform an authentication process through a preset authentication means and then transmit an authentication completion message and new user information obtained in the authentication process to the contact center server, which makes the request for identifying whether the authentication of the user is valid, when the authentication of the user is invalid.

BRIEF DESCRIPTION OF THE DRAWINGS

The above and/or other aspects of the disclosure will become apparent and more readily appreciated from the following description of the exemplary embodiments, taken in conjunction with the accompanying drawings, in which.

DETAILED DESCRIPTION

Below, embodiments of a system for providing contact center services in an integrated way according to the disclosure with the foregoing objects, solutions, and effects will be described in detail with reference to the accompanying drawings.

Figure 1:
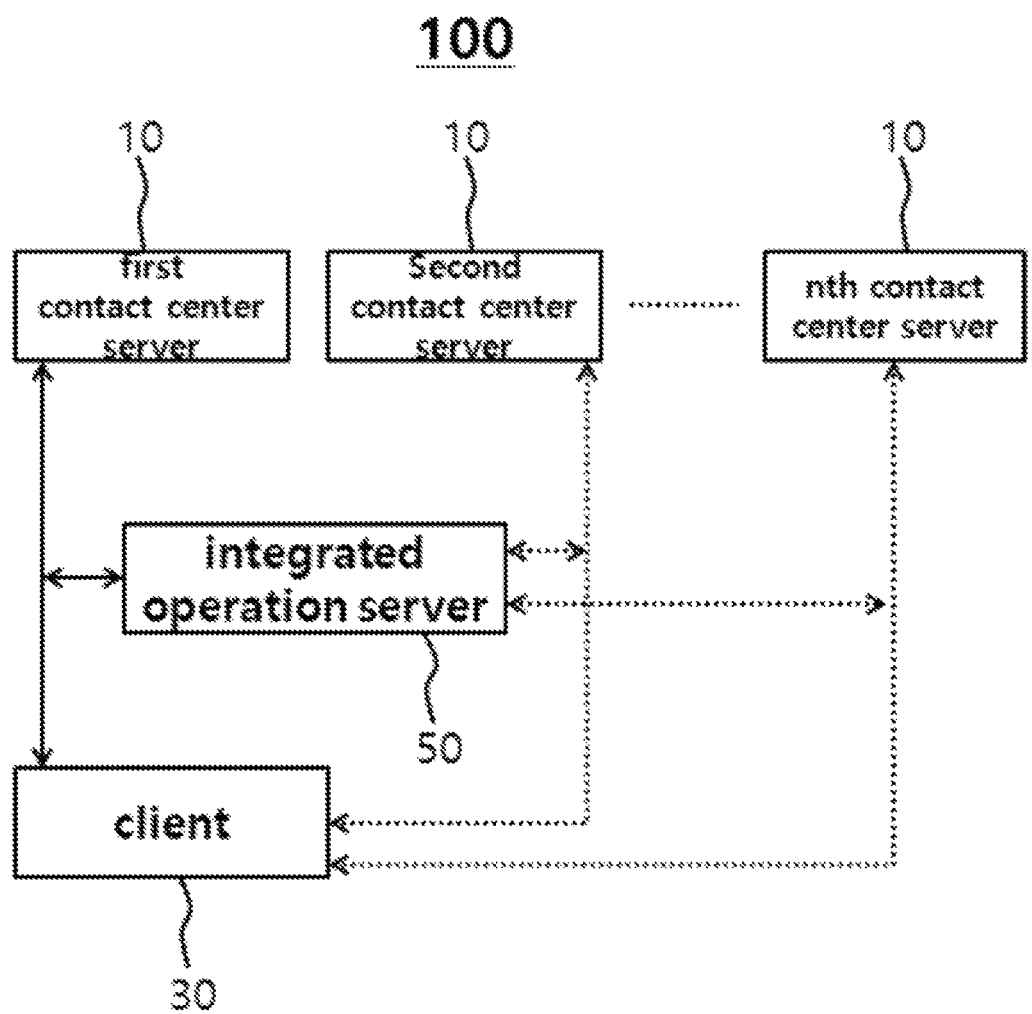
FIGS. 1 and 2 are a block diagram and a detailed block diagram of a system for providing contact center services in an integrated way according to an embodiment of the disclosure.
Figure 2:
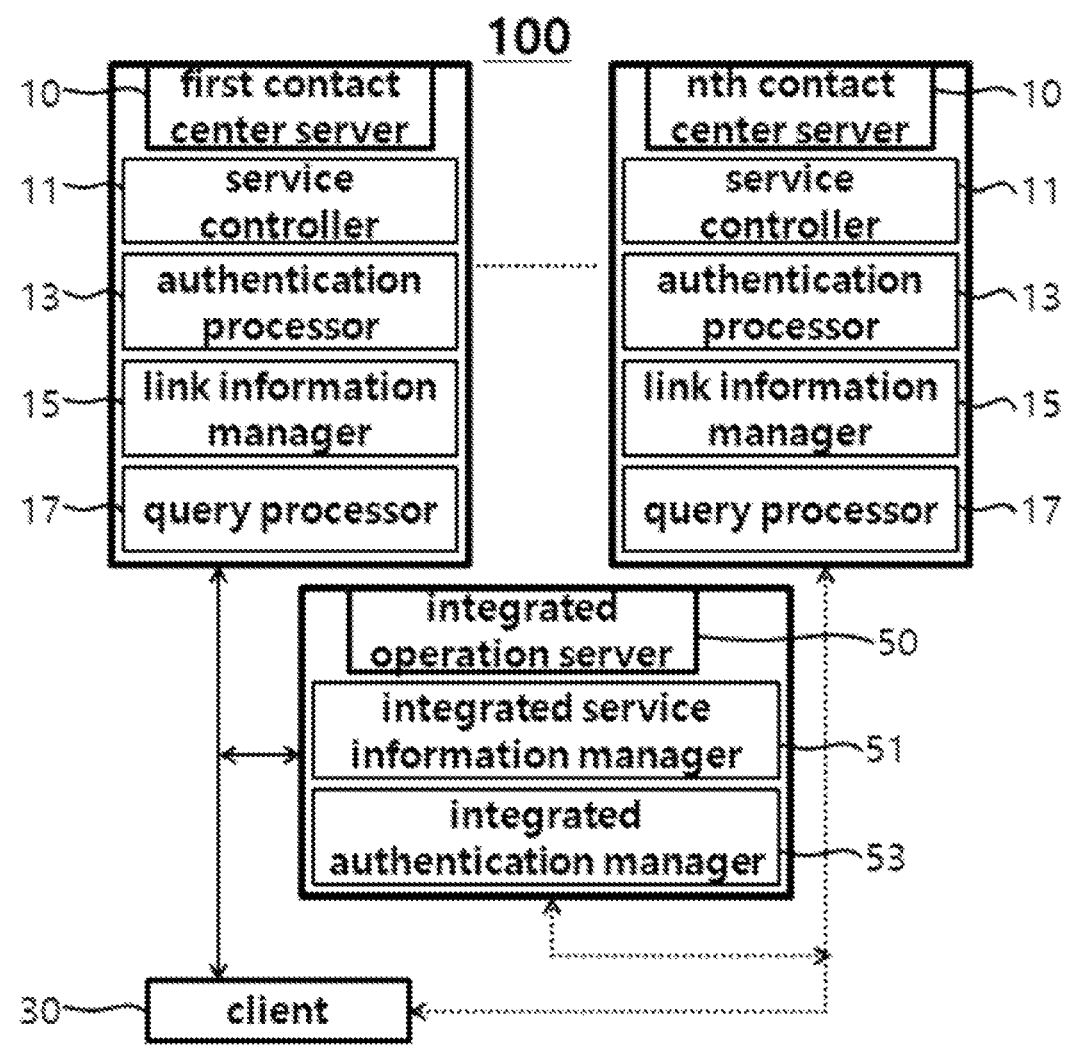

FIG. 1 is a block diagram of a system for providing contact center services in an integrated way according to an embodiment of the disclosure, and FIG. 2 is a detailed block diagram of a system for providing contact center services in an integrated way according to an embodiment of the disclosure.

As shown in FIGS. 1 and 2, a system 100 for providing contact center services in an integrated way according to an embodiment of the disclosure includes a plurality of contact center servers 10 including a first contact center server, a second contact center server, . . . , an nth contact center server; a client 30 receiving a query processing service by connecting to other contact center servers 10 without changing a current connection state while being connected to a specific contact center server 10 among the plurality of contact center servers 10; and an integrated operation server 50 storing and managing information needed for a service (hereinafter referred to as a "link service") that enables the client 30 to receive the query processing services by connecting to other contact center servers 10 while being connected to the specific contact center server 10, and carrying out an authentication process required for the link service by proxy.

The plurality of contact center servers 10 are operated by the plurality of service providers, and carry out a service that generates a response to a query received from the client 30 and transmits the response to the client 30, in other words, a query processing service. Each contact center server 10 is operated by each service provider to provide a query processing service related to a variety of business to users.

Each contact center server 10 basically performs the query processing service corresponding to the service for automatically generating a response to a query received from the client 30 and transmitting the generated response to the client 30, and further requests a call transfer to other contact center servers 10 when the client 30, which has received the query processing service by initially connecting to the contact center server 10, makes a request for connecting to other contact center servers while maintaining the current connection state so that the client 30 can receive a link service by automatically connecting to other contact center servers 10.

For example, the client 30 may receive a query processing service by connecting to the first contact center server 10 through a specific connection means (e.g., a voice-calling terminal, software, a browser, etc.), and further receive the link service by immediately connecting to at least one of other contact center servers (e.g., the second to nth contact center servers) as the first contact center server 10 requests for the call transfer while the current connection state is maintained without terminating the connection. In other words, the client 30 can receive the link service by connecting to another contact center server 10 while being connected to the first contact center server 10 without needing to terminate the connection with the first contact center server 10 to connect to another contact center server 10 by using the connection means again.

To this end, each contact center server 10 stores and manages information about the service providers cooperating in the link service, and link information about the contact center servers 10 operated by these service providers. In other words, each contact center server 10 stores and manages information (names, etc.) about the service providers cooperating in the link service, and the link information (e.g., phone numbers, etc.) about the contact center servers respectively operated by the service providers, as they are matched to each other. The information about the service providers and the link information about the contact center servers to be stored and managed in the contact center servers 10 may be stored and managed by various methods. For example, the information about the service providers and the link information about the contact center servers may be stored and managed as received from the integrated operation server 50, or as updated periodically or when the information is renewed (e.g., when there is a change in the service providers cooperating in the link service, etc.).

As described above, when the client 30 requests connection to another contact center server 10 while being initially connected to one specific contact center server (e.g., the first contact center server) among the plurality of contact center servers 10, the client 30 can receive a query processing service by connecting to at least one of other contact center servers (e.g., the second to nth contact center servers) as the specific contact center server makes a request for a call transfer. In other words, the client 30 can receive the link service by connecting to another contact center server 10 while maintaining the current connection state.

Here, the client 30 may correspond to one of various terminals or media as long as it can transmit a query to and receive a response from the contact center server 10 by connecting to the contact center server 10. For example, the client 30 may include a computer, a mobile phone, a smartphone, or the like connectable to a network.

While being connected to the specific contact center server 10, e.g., the first contact center server, the client 30 may need to receive the link service by connecting to another contact center server 10, e.g., the second contact center server. For example, the client 30 may situationally need to receive a query processing service from the contact center server 10 operated by Lotte Card Co., Ltd. while receiving a query processing service by initially connecting to the contact center server 10 operated by Hyundai Card Co., Ltd. through the connection means.

In this case, the client 30 may receive the link service by connecting to another contact center server 10 while maintaining the current connection state without terminating the current connection. Specifically, when the client 30 transmits information about a service provider, to which a link intention mark and a link query are desired to be transmitted, to a specific contact center server 10, the specific contact center server 10 recognizes that the client 30 wants to receive the link service based on the link intention mark, and requests a call transfer while transmitting various pieces of information, i.e., a country, a telecommunication company, a phone number, etc. included in session initiation protocols (SIP) of the client 30 to another contact center server 10 operated by the service provider cooperating in the link service when it is identified that the transmitted information about the service provider corresponds to the information about the service provider cooperating in the link service. Then, the contact center server 10 is automatically connected to the client 30, generates an answer to the link query, and provides a query processing service.

Here, the link query refers to a query that the client 30 wants to transmit to another contact center server 10 while being connected to the specific contact center server 10. The specific contact center server 10 needs to recognize that a user intends to make the link query. To this end, the client 30 may preferentially transmit the link intention mark to the specific contact center server 10 when a user intends to make the link query. Then, the specific contact center server 10 can recognize that the client 30 being currently connected thereto intends to make the link query to another contact center server 10, based on the link intention mark.

The client 30 transmits the link intention mark and then transmits information (name) about the service provider, to which the link query is desired to be made, to the specific contact center server 10. Then, the specific contact center server 10 identifies whether the received information about the service provider matches the information being stored and managed, i.e., information about one of the service providers cooperating in the link service. When it is identified that the service provider of the received information matches the service provider cooperating in the link service, the specific contact center server 10 makes a request for a call transfer while transmitting information about the SIP of the client 30 as the link information of the contact center server 10 operated by the service provider cooperating in the link service.

In more detail, when a client of a user transmits the link intention mark (e.g., "##") and information about the service provider, to which the link query is desired to be made (e.g., "Lotte Card Co., Ltd."), to the currently connected specific contact center server 10, the specific contact center server 10 can recognize that the client intends to make the link query using the contact center server 10 operated by Lotte Card Co., Ltd., based on "##" corresponding to the link intention mark and "Lotte Card Co., Ltd" corresponding to the information about the service provider. Then, the specific contact center server 10 requests the call transfer while transmitting various pieces of information, needed for contact with a user, included in the SIP to the contact center server 10 operated by Lotte Card Co., Ltd.

In this way, the contact center server 10 receives the link intention mark and information about one of the service providers cooperating in the link service from the client 30, and performs an operation of making a request for a call transfer based on the SIP of the client 30 to the link information (e.g., the phone number, etc.) about the contact center server 10 operated by the service provider of the received information.

The contact center server 10 making the request for the call transfer terminates the connection with the client 30 after requesting the call transfer or after the client 30 is connected to the contact center server 10 operated by the service provider to which the request for the call transfer is made. In other words, the contact center server 10 requesting the call transfer terminates the connection with the client after the client and another contact center server are automatically connected, or after requesting the call transfer. Therefore, the link query and response content between the client and another contact center server are not exposed to the contact center server 10 that makes the request for the call transfer.

Further, the contact center server 10 operated by the service provider requested to do the call transfer connects to the client 30 based on the received information about the SIP, and performs an operation of making a request for identifying whether authentication of a user is valid to the integrated operation server 50 before or after connecting to the client 30.

In other words, the contact center server 10 operated by the service provider requested to do the call transfer makes a request for identifying whether the authentication is valid to the integrated operation server 50, and connect to the client 30 based on the information about the SIP only after being notified that the authentication is valid or the authentication is validly completed, or connect to the client 30 after autonomously performing membership authentication or the like based on the information about the SIP. The contact center server 10 may also make a request for identifying whether the authentication is valid to the integrated operation server 50 when identity authentication is needed (for example, when remittance or the like business processing is required) afterwards according to the link query of the client.

After the authentication process is performed, the contact center server 10 operated by the service provider requested to do the call transfer provides a query processing service of generating a response to the link query received from the client 30 and transmitting the response to the client 30.

The integrated operation server 50 stores and manages the information about the plurality of service providers and the plurality of contact center servers, and performs an operation of carrying out the authentication process for a user of the client 30 by proxy in response to the request of the contact center server 10 operated by another contact server, i.e., the service provider requested to do the call transfer.

The integrated operation server 50 stores and manages information about the service providers that may provide the link services to the client 30. In other words, to provide the link service to the client 30, the service provider registers the cooperation in the link service while registering basic information about the service provider and link information (e.g., information about a phone number, etc.) about the contact center server operated by the service provider to the integrated operation server 50 in advance. Then, the integrated operation server 50 sends the contact center servers 10 the information about the service providers registered to cooperate with each other in the link service and the link information about the contact center servers 10 operated by the registered service providers, so that the contact center servers 10 can store and manage the information about the service providers and the link information about the contact center servers 10.

Further, the integrated operation server 50 performs the operation of carrying out the authentication process by proxy in response to the request of the contact center server operated by the service provider requested to do the call transfer. In other words, the integrated operation server 50 carries out by proxy the authentication process requested by the contact center server, which is operated by the service provider requested to do the call transfer, to connect to the client 30, or the authentication process requested as needed for processing a query after connecting to the client 30, thereby performing the authentication process for a user of the client 30.

Thus, the integrated operation server 50 is configured to carry out the user authentication in an integrated way on behalf of the service providers or the contact center servers 10 operated by the service provider, so that an end user can avoid repetitive identity authentication processes, and the service providers performing the authentication processes can also reduce time, efforts and costs incurred by repeating the identity authentication processes with regard to the valid authentication that has already completed just before the connection.

The contact center server 10 operated by the service provider requested to do the call transfer makes a request for identifying whether the authentication of a user is valid to the integrated operation server 50 before or after connecting to the client 30. When the authentication of the user is valid, the integrated operation server 50 transmits an authentication validation message and current valid user information to the contact center server 10 that makes a request for identifying whether the authentication of the user is valid. On the other hand, when the authentication of the user is invalid, the integrated operation server 50 carries out the authentication process through a preset authentication means, and then transmits an authentication completion message and new user information obtained in the authentication process to the contact center server 10 that makes a request for identifying whether the authentication of the user is valid.

The contact center server 10 operated by the service provider requested to do the call transfer makes a request for identifying whether the authentication of the user is valid (e.g., whether the user is authenticated and whether the authentication is valid) together with the contact information of the client 30 to the integrated operation server 50, because the information about the SIP includes the contact information (e.g., a phone number, etc.) of the client 30.

Then, the integrated operation server 50 identifies whether the authentication of the user is valid (whether the user is authenticated and whether the authentication is valid) with respect to the user of the client 30. Identifying whether a user's authentication is valid is to identify not only whether the user is identical to a user whose authentication has been valid but also whether authentication validity has expired even though the preexisting authentication has been valid. For example, the integrated operation server 50 identifies that authentication of a user is valid when the user has previously been validly authenticated and its authentication validity has not expired. On the other hand, the integrated operation server 50 identifies that authentication of a user is not valid when the user is initially connected to the contact center server 10 operated by the service provider requested to do the call transfer and thus the authentication has not been valid before or when the authentication validity has expired even though the authentication has been valid.

When it is identified that the authentication of the user is valid, the integrated operation server 50 transmits the authentication validation message and the current valid user information to the contact center server 10 that received the link query. Because the integrated operation server 50 is storing and managing information about a user whose authentication is valid, i.e., information needed for the authentication of the user (e.g., a phone number, a name, a birth date, etc.), the valid user information being currently stored and managed is transmitted to the contact center server 10 operated by the service provider requested to do the call transfer when it is identified that the authentication of the user is valid. Then, the contact center server 10 operated by the service provider requested to do the call transfer generates a response to the link query and provides a query processing service by using the user information as basic information by connecting to the client or while being in the connected stated.

On the other hand, when it is identified that the authentication of the user is invalid, the integrated operation server 50 performs a user authentication process using the present authentication means, and then transmits an authentication completion message and new user information obtained in the authentication process to the contact center server 10 operated by the service provider requested to do the call transfer. The integrated operation server 50 makes the user authentication process be carried out through the authentication means, which is previously set based on the selection of the service provider operating the contact center server 10 operated by the service provider requested to do the call transfer, among various authentication means such as Kakao Pay, PASS, Shinhan authentication, KB authentication, public authentication, integrated authentication, etc.

Because the user uses information such as a phone number, a name, birth date, and the like needed for checking a real name and identification to pass the authentication process, the integrated operation server 50 can newly obtain the user's information when the user authentication is completed. Therefore, the integrated operation server 50 identifies that the authentication of the user who newly passed the authentication process is valid, and stores and manages the information about the user whose authentication is valid. Further, when the authentication is completed, the integrated operation server 50 transmits an authentication completion message and new user information obtained during the authentication process to the contact center server 10 operated by the service provider requested to do the call transfer. Then, the contact center server 10 that received the link query generates a response to the link query by connecting to the client or using the user information as the basic information and provides the query processing service.

Below, detailed configurations and operations of the contact center server 10, the client 30 and the integrated operation server 50 in the system 100 for providing contact center services in an integrated way will be further described according to an embodiment of the disclosure.

The integrated operation server 50 includes an integrated service information manager 51 and an integrated authentication manager 53.

The integrated service information manager 51 is configured to store and manage the basic information of the service providers cooperating in the link service and the link information of the contact center servers 10 operated by the service providers, which are matched to each other. Therefore, the service providers, which want to cooperate with each other in the link service, are configured to register and store their own basic information and the link information of the contact center servers they operate to the integrated service information manager 51 of the integrated operation server 50 in advance.

Further, when the service provider registered to cooperate in the link service does not want to share the link service with other service providers, the integrated service information manager 51 stores and manages the information about the service providers, with which the link service is desired not to be shared, as being matched to the service providers registered to cooperate in the link service. Therefore, the service providers which want to cooperate in the link service make other service providers, with which the link service is desired not to be shared, be selectively stored and managed in the integrated service information manager 51 of the integrated operation server 50 in advance. Consequently, it is possible to reflect the intention of the specific service providers which do not want to share the link service with other service providers for various reasons such as competition or the like.

The integrated service information manager 51 may transmit pieces of information being stored and managed, i.e., information (a company name, etc.) about the service provider cooperating in the link service, and the link information of the contact center server 10 being operated by the service provider to each contact center server 10. However, when a service provider, with which a specific service provider does not want to share the link service, is selected, the integrated service information manager 51 does not transmit the information of the specific service provider and the link information of the contact center server the specific service provider operates to the contact center server 10 the selected service provider operates.

After that, when there is a change due to new registration or withdrawal in the service providers registered to cooperate in the link service, or when there is a change in the link information of the specific contact center server, or when there is a change in selection of sharing with the link service (when a service provider with which the link service is desired not to be shared is added or deleted), the integrated service information manager 51 may transmit the changed information to each contact center server 10.

The integrated authentication manager 53 may be configured to store and manage various authentication means (Kakao Pay, PASS, Shinhan authentication, KB authentication, public authentication, integrated authentication, etc.), and store and manage the service providers registered to cooperate in the link service and at least one authentication means selected by those service provides as being matched to each other when the service provider registered to cooperate in the link service selects at least one among various authentication means. Therefore, when the client 30 transmits the link query to the contact center server 10 operated by the service provider registered to cooperate in the link services, the integrated authentication manager 53 may allow a user of the client 30 to undergo the authentication process through the authentication means stored and managed as being matched to the service provider operating the contact center server 10 that received the link query.

The integrated authentication manager 53 stores and manages authentication validity of a user, and stores and manages information about the user whose authentication is valid. Therefore, when the contact center server that received the link query makes a request for identifying whether authentication of a user is valid, it is identified whether the authentication of the user is valid, with reference to the stored and managed authentication validity of the user and the stored and managed information about the user.

In this way, the integrated authentication manager 53 of the integrated operation server 50 performs user authentication in an integrated way on behalf of the service providers or the contact center servers 10 operated by the service providers, so that a user can ultimately avoid repetitive authentication processes and the service providers providing the authentication processes can also reduce time, efforts and costs incurred by repeating the authentication processes for the user who has already been validly authenticated just before access.

The contact center server 10 includes a service controller 11, an authentication processor 13, a link information manager 15, and a query processor 17. The service controller 11 controls general operations of the contact center server 10.

When the client 30 tries accessing the contact center server 10 through the accessing means, the authentication processor 13 performs the authentication process for a user of the client 30 under control of the service controller 11. In other words, the authentication processor 13 carries out the authentication for a user of the client through at least one of various authentication means such as Kakao Pay, PASS, Shinhan authentication, KB authentication, public authentication, integrated authentication, etc.

The service controller 11 allows the access of the client 30 when the user is authenticated by the authentication processor 13, and provides the query processing service of generating a response through the query processor 17 and transmitting the response to the client 30 when a query is received from the client 30. The query processor 17 may analyze the received query and then generate a response based on a database (not shown) of the service provider, and transmit the generated response to the client 30 under control of the service controller 11, thereby providing the query processing service.

The link information manager 15 stores and manages the information about the service providers cooperating in the link service, and the link information of the contact center servers being operated by the service providers. Under control of the service controller 11, the link information manager 15 is connected to the integrated operation server 50, stores and manages pieces of information received from the integrated service information manager 51, and updates the information with changed information received from the integrated service information manager 51 as described above.

With a system for providing contact center services in an integrated way according to the disclosure with the foregoing objects, solutions, and effects, a user can use a plurality of query processing services without difficulties by linking the contact center servers operated by the plurality of service providers, thereby minimizing the time, efforts and costs of the user who wants to receive the plurality of query processing services through the plurality of service providers.

Although a few exemplary embodiments of the disclosure have been shown and described, these are for illustrative purpose only and it will be appreciated by those skilled in the art that changes may be made in these embodiments without departing from the principles and spirit of the invention, the scope of which is defined in the appended claims and their equivalents.

What is claimed is:

1. A system for providing contact center services in an integrated way, comprising:

a plurality of contact center servers operated by a plurality of service providers, and configured to provide a query processing service that generates a response to a query received from a client and transmits the response to the client;

a client configured to receive a query processing service by connecting to a different contact center server when making a request for connecting to the different contact center server while being connected to a specific contact center server among the plurality of contact center servers; and an integrated operation server configured to store and manage information about the plurality of service providers and the plurality of contact center servers, and perform an authentication process by proxy with regard to a user of the client as requested by the different contact center server.

2. The system of claim 1, wherein the contact center server is configured to store and manage information about service providers cooperating in a link service, and link information about the contact center servers operated by the service providers.

3. The system of claim 2, wherein, when receiving a link intention mark and information about one of the service providers cooperating in the link service from the client, the contact center server makes a request for a call transfer while transmitting information about session initiation protocols (SIP) of the client to the link information of the contact center server operated by the service provider of which the information is received.

4. The system of claim 3, wherein the contact center server making the request for the call transfer is configured to terminate connection with the client after making the request for the call transfer or after the client is connected to a contact center server operated by a service provider requested to do the call transfer, the contact center server operated by the service provider requested to do the call transfer is configured to connect to the client based on the information about the SIP and makes a request for identifying whether authentication of the user is valid to the integrated operation server before or after connecting to the client, and the integrated operation server is configured to transmit an authentication validation message and current valid user information to the contact center server, which makes the request for identifying whether the authentication of the user is valid, when the authentication of the user is valid, and perform an authentication process through a preset authentication means and then transmit an authentication completion message and new user information obtained in the authentication process to the contact center server, which makes the request for identifying whether the authentication of the user is valid, when the authentication of the user is invalid.

\* \* \* \* \*